United States Patent [19]

Clarke, III

[11] 3,925,453

[45] Dec. 9, 1975

[54] QUATERNARY AMINOALKYLENE PHOSPHONIC ACIDS AND METHOD OF PREPARATION

[75] Inventor: Fredric B. Clarke, III, St. Louis, Mo.

[73] Assignee: Monsanto Company, St. Louis, Mo.

[22] Filed: Jan. 25, 1974

[21] Appl. No.: 436,417

[52] U.S. Cl.... 260/501.12; 260/239 A; 260/239 EP; 260/293.51; 260/326.61; 260/429.9; 260/439 R; 210/59
[51] Int. Cl.² .......................................... C07F 9/38
[58] Field of Search ............... 260/502.5, 501.12

[56] References Cited
UNITED STATES PATENTS

| 2,774,786 | 12/1956 | Erickson | 260/501.12 |
|---|---|---|---|
| 2,841,611 | 7/1958 | Bersworth | 260/501.12 |
| 2,847,442 | 8/1958 | Sallmann | 260/502.5 |
| 3,400,148 | 9/1968 | Quimby | 260/501.12 |
| 3,453,301 | 7/1969 | Uhing | 260/501.12 |
| 3,507,937 | 4/1970 | Zimmerer | 260/501.12 |
| 3,738,937 | 6/1973 | Kautsky | 260/501.12 |
| 3,751,451 | 8/1973 | Samour et al. | 260/501.12 |
| 3,792,084 | 2/1974 | Quinlan | 260/501.12 |

FOREIGN PATENTS OR APPLICATIONS

| 4,714,129 | 4/1972 | Japan | 260/501.12 |

*Primary Examiner*—James O. Thomas, Jr.
*Assistant Examiner*—Nicky Chan
*Attorney, Agent, or Firm*—Wayne R. Eberhardt; Thomas B. Leslie

[57] ABSTRACT

Quaternary aminoalkylene phosphonic acids such as N-methyl aminotri(methylene phosphonic acid) of the formula

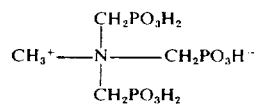

are prepared by reacting an aminoalkylene phosphonic acid with an alkyl halide in a polar solvent and in the presence of a hindered tertiary amine. The compounds are useful as metal complexing agents.

12 Claims, No Drawings

QUATERNARY AMINOALKYLENE PHOSPHONIC ACIDS AND METHOD OF PREPARATION

BACKGROUND OF THE INVENTION

1. Field of the Invention

The present invention relates to quaternary aminoalkylene phosphonic acid compounds and salts thereof, and to a method for the preparation thereof from tertiary aminoalkylene phosphonic acid compounds.

2. Description of the Prior Art

Aminoalkylene phosphonic acids and salts thereof such as aminotri(methylene phosphonic acid) and the alkali metal and ammonium salts thereof are well-known compounds and recognized metal complexing agents. The quaternization of such compounds has not heretofore been achieved. Under normal reaction conditions, there is apparent protonation, and consequent blockage, of the free electron pair on the central nitrogen atom. Conditions which are sufficiently alkaline to remove said proton tend to destroy the alkylating agent faster than it can react in the desired fashion.

It is accordingly an object of the present invention to prepare as novel compositions of matter quaternized aminoalkylene phosphonic acid compounds. It is a further object of this invention to provide a method for the preparation of said novel compositions. Yet other objects of this invention will be apparent from the ensuing description.

SUMMARY

Quaternary aminoalkylene phosphonic acids and salts thereof having the general structure

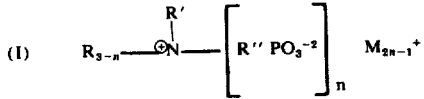

wherein each R is individually an alkyl, alkenyl, cycloalkyl, or aralkyl radical having from 1 to about 40 carbon atoms, or a

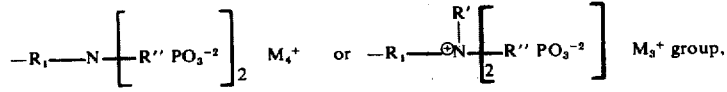

wherein each $R_1$ is individually alkylene or alkenylene of 2 to 8 carbon atoms, each R' is individually alkyl or alkenyl of 1 to about 40 carbon atoms, each R'' is individually alkylene or alkenylene of 1 to about 6 carbon atoms, n is 1 to 3, and each M is individually hydrogen, alkali metal or ammonium ion. In addition, when n is 1, two R groups together with the adjacent nitrogen may form a heterocyclic ring having from 3 to about 10 ring members.

These compounds are prepared by reacting an aminoalkylene phosphonic acid compound with an alkylating agent such as an alkyl halide in polar organic solvent and in the presence of a hindered tertiary amine.

DESCRIPTION OF PREFERRED EMBODIMENTS

The quaternary aminophosphonic acid compounds at Formula I are derived from corresponding tertiary aminophosphonic compounds having the general formula (II) $R_{3-n} - N - (R'' PO_3H_2)_n$ wherein R, R'' and n are as defined above.

In a preferred embodiment of the present invention, R is (1) an alkyl or alkenyl radical of from about 1–20 carbon atoms, and most preferably from about 1 to 12 carbon atoms; (2) a cycloalkyl radical of 5 or 6 carbon atoms, or (3) an aralkyl radical having from 1 to 4 carbon atoms in the alkyl portion of the radical, and from 1 to 3 rings in the aromatic portion, with the benzyl radical being a preferred example of an aralkyl radical. In addition, where n is 1, the R groups may, together with the adjacent nitrogen, form a heterocyclic ring having from 3 to about 10 members such as, for example, the aziridine, azetidine, pyrollidine, and piperidine radicals.

Also in a preferred embodiment of the present invention, R'' is a lower alkylene, alkenylene or alkylidene radical of from 1 to about 6 carbon atoms and may be straight chain or branched, including for example methylene, ethylene, isopropylene, hexylene and ethylidene. Most preferably, however, R'' is methylene.

The quaternary aminoalkylene phosphonic acid radicals of Formula I are also derived from polyalkylene polyaminopoly(alkylene phosphonic acids) such as those having the general formula

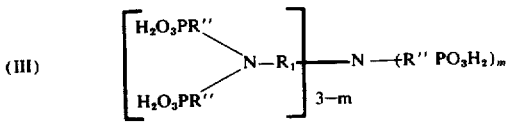

m is 1 or 2 and $R_1$ and R'' are as defined above.

Specific examples of preferred methylene phosphonic acids within the scope of Formula II include, but are not limited to, aminotri(methylene phosphonic acid), methyl aminodi(methylene phosphonic acid), dodecyl aminodi(methylene phosphonic acid), dimethyl aminomethylene phosphonic acid, didodecylaminomethylene phosphonic acid, ethyl hexyl aminomethylene phosphonic acid, 2-ethyl hexyl aminodi(methylene phosphonic acid), ethylene imino-methylene phosphonic acid, propylene iminomethylene phosphonic acid, pyrollidinomethylene phosphonic acid and piperidinomethylene phosphonic acid.

Specific examples of preferred methylene phosphonic acid compounds within the scope of Formula III include, but are not limited to, ethylene diamine tetra(methylene phosphonic acid), diethylene triamine penta(methylene phosphonic acid), hexamethylene diamine tetra(methylene phosphonic acid), and bishexamethylene triamine penta(methylene phosphonic acid).

Alkylating agents useful in quaternizing the tertiary aminophosphonic acid compounds of Formulas II and III are of the formula (IV) R' — X where R' is as defined above and X is halide, acetate, toluene sulfonate, benzene sulfonate or other "leaving group". Preferably, R' is an alkyl or alkenyl group having from 1 to about 20 carbon atoms, and more preferably from 1 to about 6 carbon atoms. Particularly preferred alkylating agents are the lower alkyl halides such as methyl iodide.

Hindered tertiary amines useful in the method of the present invention are those amines having a pKa of at least about 8, and preferably from about 8 to about 11. Amines having a pKa of less than about 8 or more than about 11 are not preferred since the rate of reaction may be drastically reduced at any lower pKa while appreciable hydrolysis of the alkylating agent may occur at any higher pKa. The hindered tertiary amine serves as a proton scavenger in the quaternization reaction. In this capacity it is preferred that the nitrogen of this amine be at least as basic as the nitrogen of the tertiary aminophosphonic acid compound being quaternized, and that the amine be sufficiently hindered to inhibit quaternization of itself. Preferred hindered tertiary amines are the diisopropyl alkyl amines where the alkyl is from 2 to about 20 carbon atoms and may be aliphatic or alicyclic. Diisopropyl ethyl amine and diisopropyl cyclohexyl amines are illustrative of suitable compounds. Other tertiary amines not readily quaternized and having a pKa of from about 8 to about 11 will be readily apparent to those skilled in the art.

Solvents useful in the method of the instant invention are the organic polar solvents such as the lower alcohols, dimethyl formamide, dimethyl sulfoxide, and hexamethylphosphorotriamide.

The quaternary aminoalkylene phosphonic acid compounds of the instant invention are prepared in accordance with the method of the instant invention by reacting a tertiary aminophosphonic acid compound of Formula II or III with an alkylating agent of Formula IV in polar solvent and in the presence of a hindered tertiary amine proton scavenger as defined above.

In the method of the instant invention, the tertiary aminophosphonic acid and alkylating agent reactants are combined with the hindered tertiary amine and solvent in a reactor equipped with an agitator, heating means and a reflux condenser. The ratio of alkylating agent to tertiary aminophosphonic acid preferably at least about 1/1, and most preferably from about 1.5/1 to about 3/1 on a molar equivalent basis. Although amounts of alkylating agent in excess of 3/1 can be used, large excesses tend to force alkylation of the hindered tertiary amine with a resulting decrease in overall process efficiency.

The ratio of hindered tertiary amine to tertiary aminophosphonic acid is preferably at least about 1.5/1, and most preferably from about 2/1 to about 5/1 on a molar equivalent basis. Although amounts of hindered tertiary amine in excess of 5/1 can be used, large excesses merely require additional recovery efforts with a resulting decrease in overall process efficiency.

The solvent provides a medium for reaction and a sufficient amount is used to allow the reactants and the hindered amine to form a reactable mass. In general, the solvent will constitute from 20 to 90 percent by weight of the total reaction mass, although greater amounts may of course be used. It is preferable that sufficient solvent be employed to yield a homogeneous reaction mixture, and most preferably a uniform solution of the other constituents. Lower alcohols, particularly methyl, ethyl, propyl and butyl alcohols are preferred solvents and normally constitute from 50 to 80 percent of the reaction mass.

After combining the above ingredients, the reaction mixture is heated to from about 50°C. to about 250°C. with stirring to promote the alkylation of the tertiary aminophosphonate. While a significant amount of reaction begins to take place at about 50°C., higher temperatures are preferred to increase the rate of reaction. In an atmospheric system, the reaction mass is preferably heated to and held at reflux temperature for a time sufficient to bring the reaction to completion. Reflux temperature and time depend on the composition of the reaction mass and the nature of the material being reacted. It is generally preferred, however, for most systems, that the reaction temperature be at least about 75°C., and the reaction time be less than about 12 hours. Where higher temperatures and shorter reaction times are desired, superatmospheric pressure systems may be employed to obtain reaction temperature up to about 150°C., although even higher temperatures up to about 250°C. or higher may be used in some cases. By utilizing perssurized reactors and higher temperatures, reaction time may be decreased to one hour or less in many cases.

After the reaction is complete, the quaternary aminoalkylene phosphonic acid product is recovered as a waxy or oily solid by cooling the reaction mass to room temperature or lower. The recovery of product may be accompanied by the formation of a crystalline precipitate of alkylated tertiary amine. Normally the desired reaction product deposits on the cool surfaces of the reactor while the crystalline precipate forms in the mother liquor, and separation of the desired product is readily accomplished by decantation.

The waxy solid reaction product is the quaternized aminoalkylene phosphonic acid and may be used as such to form metal ion complexes in aqueous systems, or it may be further purified to remove included amounts of other materials from the reaction. Purification is conveniently accomplished by washing with organic solvents, formation and separation of salts, ion exchange, and other conventional procedures. One such method of purification is described in the following example which illustrates a preferred embodiment of the present invention and is not limiting thereof.

EXAMPLE

Into a flask equipped with an agitator, heating jacket and reflux condenser are charged 5.98 g. (20 m moles) of aminotri(methylene phosphonic acid), 12.93 g. (100 m moles) of diisopropyl ethyl amine, 18.6 g. (131 m moles) of methyl iodide, and 50 ml. of ethanol. The mixture was heated with stirring to reflux at about 75°C., and held at reflux for 12 hours. During reflux, an oily solid was seen to deposit on the walls of the flask. After the reflux period, the reaction mixture was cooled to room temperature and a crystalline precipitate appeared in the reaction mass. The crystalline precipitate, which was identified as diisopropyl ethyl amine methiodide, and liquor were poured off, and the waxy or oily solid product on the walls of the flask was dissolved in 100 ml. water. Solid KOH was added to the flask until the pH was about 14, and the aqueous solution extracted with two 50 ml. portions of chloroform and then evaporated to give an amorphous glass which was well washed with three 100 ml. portions of acetone.

The product was then redissolved in water and passed through a hydrogen form ion-exchange resin to reconvert to the acid form, and finally evaporated to dryness.

The resulting product was identified as

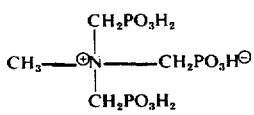

by proton n.m.r. analysis in $D_2O$ at 60 $MH_z$ which showed a doublet for the N—C—P linkage at 5.5δ and a singlet for the $CH_3$—N linkage at 3.9δ with relative intensities of 2:1.

On trituration with ethanol, the acid glass crystallized as the monoethanolate, and 3.6 g. were recovered for a 50% yield. An elemental analysis of the product which identified the material as $C_4H_{14}NO_9P_3 \cdot C_2H_5OH$ was as follows:

Calculated C, 20.06; H, 5.61; P, 25.87 Found C, 19.83; H, 5.32; P, 25.76

In the preceding example, the crude waxy solid methyl aminotri(methylene phosphonic acid) initially recovered from the reaction flask was conveniently purified by converting to the potassium salt and washing with acetone to remove acetone soluble potassium iodide. By similar selection of procedures and solvents which will be apparent to those skilled in the art, purification of material obtained by reaction with alkylating agents other than alkyl iodide may be readily achieved, and such purification or refining procedures are not an essential part of the instant invention.

It will be apparent to those skilled in the art that some variation in the method described herein is possible without departing from the scope of the invention. For example, it is permissible to employ a tertiary aminophosphonic acid anhydride as a starting reactant and hydrolyze to the acid as part of the total quaternization reaction. Other ingredients such as accelerators, promoters, and catalysts for the basic reaction may also be included. These and other variations of the basic reaction are within the scope of the invention described and disclosed herein.

While the aforegoing description has been directed to quaternary aminoalkylene phosphonic acids and alkali metal and ammonium salts of those acids, other novel compositions, particularly metal ion complexes, will be obtained in the use of those acids and salts. For example, the acids or salts of the instant invention may be added to aqueous systems containing calcium, magnesium, iron, zinc, and other metal and alkaline earth metal ions in order to form complexes with these ions and prevent or inhibit scale formation and/or corrosion in such aqueous systems. Such metal ion complexes are accordingly within the scope and contemplation of the instant invention.

The embodiments of this invention in which an exclusive property on privilege is claimed are defined as follows:

1. Quaternary aminoalkylene phosphonic acids and salts thereof having the general formula

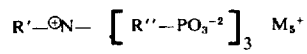

wherein R' is alkyl of 1 to about 20 carbon atoms; R'' is alkylene or alkylidene of 1 to about 6 carbon atoms, and each M is individually hydrogen, alkali metal or ammonium ion.

2. A compound of claim 1 wherein R' is methyl.
3. A compound of claim 1 wherein M is alkali metal.
4. A compound of claim 1 where R'' is methylene.
5. Methyl aminotri(methylene phosphonic acid).
6. A process for preparing quaternized aminoalkylene phosphonic acid compounds which comprises contacting a tertiary aminoalkylene phosphonic acid of the formula

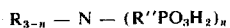

or

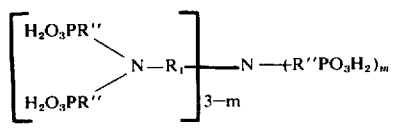

wherein each R is individually an alkyl, cycloalkyl or aralkyl radical having from 1 to about 20 carbon atoms, $R_1$ is alkylene of from 2 to 8 carbon atoms, R'' is alkylene or alkylidene of 1 to about 6 carbon atoms, n is 1 to 3 and m is 1 or 2, with an alkylating agent of the formula R'—X wherein R' is an alkyl or alkenyl group having from 1 to about 20 carbon atoms and X is halide, acetate, toluene sulfonate or benzene sulfonate in a polar organicsolvent and organic solvent the presence of a tertiary alkyl amine sufficiently hindered to inhibit quaternization thereof and having a pKa of from about 8 to about 11 at a temperature of from about 50°C. to about 250°C. for a time sufficient to achieve significant alkylation of the aminoalkylene phosphonic acid.

7. A process of claim 6 wherein the alkylating agent is selected from the group consisting of alkyl halides, alkyl acetates, alkyl benzene sulfonate, and alkyl toluene sulfonate.

8. A process of claim 6 wherein said polar organic solvent is selected from the group consisting of lower alcohols, dimethylformamide, dimethylsulfoxide, and hexamethyl phosphorotriamide.

9. A process of claim 6 wherein the hindered tertiary amine is a diisopropyl alkyl amine wherein the alkyl has from 2 to about 20 carbon atoms.

10. A process of claim 6 wherein the molar ratio of said alkylating agent to said tertiary aminophosphonic acid is at least 1/1 and the ratio of said hindered tertiary amine to said tertiary aminophosphonic acid is at least about 1.5/1.

11. A process of claim 10 wherein said tertiary aminophosphonic acid is aminotri(methylene phosphonic acid), said alkylating agent is an alkyl halide having from 1 to about 20 carbon atoms, said hindered tertiary amine is diisopropyl alkyl amine wherein the alkyl has from about 2 to 20 carbon atoms, and said polar organic solvent is a lower alkyl alcohol.

12. A process of claim 11 wherein said quaternized aminoalkylene phosphonic acid is methyl aminotri(methylene phosphonic acid) and said alkylating agent is methyl iodide.

* * * * *

UNITED STATES PATENT OFFICE
CERTIFICATE OF CORRECTION

PATENT NO. : 3,925,453
DATED : December 9, 1975
INVENTOR(S) : Fredric B. Clarke, III It is certified that error appears in the above-identified patent and that said Letters Patent are hereby corrected as shown below:

Column 1, Summary, the structure following "or"

Reads 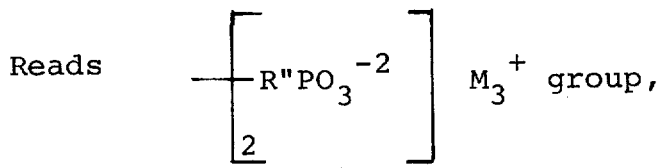

should read -- 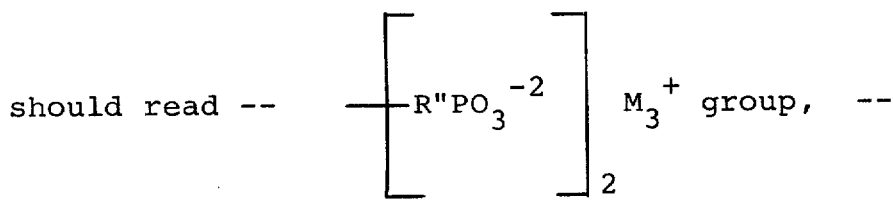

Col. 4, line 30, "precipate" should be -- precipitate --

Col. 5, line 58, "on" should be -- or --

Col. 6, line 33, should read -- a polar organic solvent and in the presence --

Signed and Sealed this twentieth Day of April 1976

[SEAL]

Attest:

RUTH C. MASON
Attesting Officer

C. MARSHALL DANN
Commissioner of Patents and Trademarks